US008731984B2

(12) United States Patent
Rodriguez et al.

(10) Patent No.: US 8,731,984 B2
(45) Date of Patent: May 20, 2014

(54) GLOBAL CONCIERGE

(75) Inventors: Michael Rodriguez, Los Angeles, CA (US); Nicola Stiff, Mill Valley, CA (US)

(73) Assignee: Visa International Service Association, San Francisco, CA (US)

( * ) Notice: Subject to any disclaimer, the term of this patent is extended or adjusted under 35 U.S.C. 154(b) by 428 days.

(21) Appl. No.: 12/603,370

(22) Filed: Oct. 21, 2009

(65) Prior Publication Data

US 2010/0268570 A1 Oct. 21, 2010

Related U.S. Application Data

(60) Provisional application No. 61/170,501, filed on Apr. 17, 2009.

(51) Int. Cl.
*G06Q 10/00* (2012.01)

(52) U.S. Cl.
USPC .................. 705/7.11; 705/5; 705/6; 705/318

(58) Field of Classification Search
USPC ........................................ 705/7.11, 5, 6, 318
See application file for complete search history.

(56) References Cited

U.S. PATENT DOCUMENTS

| | | | |
|---|---|---|---|
| 7,499,864 B2* | 3/2009 | Campbell et al. ................ 705/5 |
| 8,032,438 B1 | 10/2011 | Barton et al. |
| 8,160,614 B2* | 4/2012 | Shaffer et al. ............. 455/456.3 |
| 2002/0156661 A1* | 10/2002 | Jones et al. ........................ 705/6 |
| 2003/0007620 A1* | 1/2003 | Elsey et al. ............. 379/218.01 |
| 2003/0013438 A1* | 1/2003 | Darby ........................... 455/419 |
| 2003/0055689 A1* | 3/2003 | Block et al. ...................... 705/5 |
| 2003/0069777 A1* | 4/2003 | Or-Bach ........................... 705/9 |
| 2004/0015380 A1* | 1/2004 | Timmins .......................... 705/8 |
| 2007/0100773 A1* | 5/2007 | Wallach ......................... 705/75 |
| 2007/0233528 A1* | 10/2007 | Jafri et al. ........................ 705/5 |
| 2008/0082373 A1* | 4/2008 | Durocher et al. ................. 705/6 |
| 2008/0198761 A1* | 8/2008 | Murawski et al. ............ 370/254 |
| 2009/0074168 A1* | 3/2009 | Henry ....................... 379/201.12 |
| 2010/0023455 A1* | 1/2010 | Dispensa et al. ............... 705/44 |
| 2010/0057690 A1* | 3/2010 | Chu et al. ......................... 707/3 |
| 2010/0076862 A1* | 3/2010 | Lefkowitz ...................... 705/27 |
| 2013/0103439 A1 | 4/2013 | Vernitsky et al. |

OTHER PUBLICATIONS

Search/Examination Report dated Nov. 29, 2010 from International Patent Application No. PCT/US2010/031282, 13 pages.

* cited by examiner

*Primary Examiner* — Peter Choi
*Assistant Examiner* — Darlene Garcia-Guerra
(74) *Attorney, Agent, or Firm* — Kilpatrick Townsend Stockton LLP

(57) ABSTRACT

A method for receiving, processing and managing service requests from a user is disclosed. The method includes receiving the service request from a user at a concierge service, generating an itinerary from the service request, sending the itinerary to a server in a consumer relation management system and automatically coordinating the service items of the service request among one or more concierge services. A method for automatically notifying a credit or debit card issuer about the future travel plan of a user is also disclosed. The method includes using the generated itinerary to automatically populate a security profile, and transfer the data from the security profile to an issuer, where the issuer uses these data to authorize future transactions in different locations that would normally be declined.

11 Claims, 9 Drawing Sheets

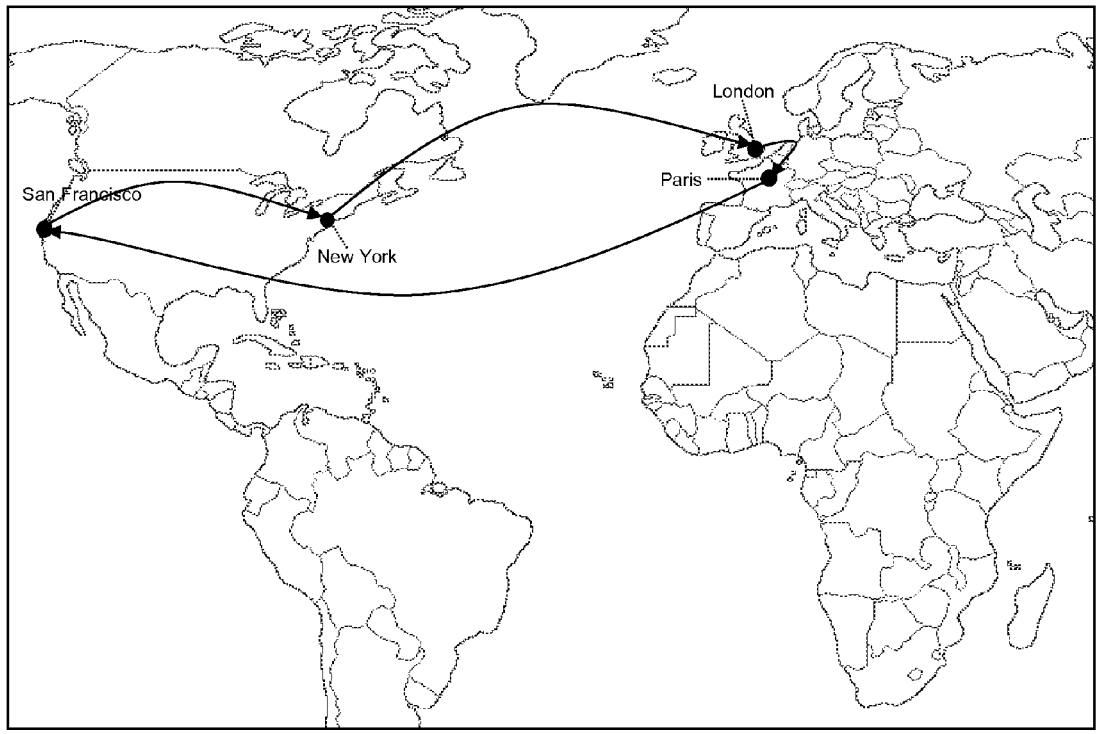

ITINERARY 300

Item 1 – Airline ticket from San Francisco to New York
Item 2 – Airline ticket from New York to London
Item 3 – Airline ticket from London to Paris
Item 4 – Airline ticket from Paris to San Francisco
Item 5 – Hotel reservation in New York
Item 6 – Hotel reservation in London
Item 7 – Hotel reservation in Paris
Item 8 – Roundtrip limousine service in San Francisco
Item 9 – Roundtrip limousine service in New York
Item 10 – Roundtrip limousine service in London
Item 11 – Roundtrip limousine service in Paris
Item 12 – Car rental in Paris
Item 13 – Restaurant reservation in New York
Item 14 – Gift package delivery in San Francisco
Item 15 – Show ticket reservation in Paris

*FIG. 3*

GLOBAL CONCIERGE

CROSS-REFERENCES TO RELATED APPLICATIONS

This patent application is a non-provisional of and claims priority to U.S. Provisional Application No. 61/170,501 filed Apr. 17, 2009, entitled "Global Concierge," the entire disclosure of which is incorporated herein by reference.

BACKGROUND

Today, there are concierge services located in hotels or operating as independent businesses or may be a portion of other service related entities. A concierge service, in a hotel, for example, helps the hotel guests by providing information such as location of a particular restaurant, or by performing a service such as obtaining a reservation of tickets for a show. In the context of an independent business, a concierge service provides services such as airline ticket reservations, hotel reservations, transportation service reservations, event ticket services, restaurant reservations, etc. Typically, a consumer contacts a concierge service with one or more requests, and the concierge service performs the requests and charges the consumer for the services provided. One of the drawbacks of using a concierge service, as it exists today, is that the services which a concierge provides are localized. Concierges may not be able to fulfill a request beyond the local limits of their expertise and access to various resources. For example, if a consumer, in San Francisco, is in need of a service in New York City, a concierge service in San Francisco may not be able to fulfill that request, if the concierge does not have access to resources in New York City.

Also, if a concierge service attempts to expand its reach by designating or establishing a series of local concierge services, the concierge service may find direct and timely response to consumer requests at these local sites difficult due to the logistics of communication and resource coordination among local concierges.

Therefore, it would be desirable to provide an automated system and method for managing consumers' requests with efficiency on a global scale.

Another problem that is exists for travelers is that their payment card transactions can be denied as they move from place to place, because fraud detection modules may incorrectly believe that a fraudulent transaction is occurring. For example, if a person lives in Los Angeles and is in Paris, France on business, a payment authorization module may deny authorization of the transaction if the person tries to purchase a good or service in Paris, and the person did not notify his payment card issuer of his travel prior to leaving for this business trip. This is because a fraud detection module that operates in conjunction with the authorization module may determine that the transaction is occurring outside of the person's home city and that any transactions occurring outside of the home city could be a potential fraud. If payment card transactions are inadvertently denied, sales using payments cards will decrease. This will result in reduced sales, because in some instances, the person may not conduct the purchase at all if the payment card transaction is denied.

These and other problems, are addressed by embodiments of the invention, individually and collectively.

SUMMARY

Embodiments disclosed herein are directed to systems and methods for global concierge services. The global concierge service system can be implemented using one or more computer apparatus. In embodiments of the invention, an initial service request comprising a plurality of service items is received at a computer apparatus. The computer apparatus determines which set of a plurality of concierges can service the service items and outputs service requests to set of concierges. The plurality of services requests are provided in a coordinated manner.

Other embodiments of the invention are directed to systems and methods for providing transaction authorization controls based on an itinerary. One embodiment of the invention is directed to a method including receiving data associated with an itinerary for a trip at a computer apparatus, wherein the itinerary indicates that a user will travel to different locations at predetermined times, and allowing transactions to be authorized at the different locations and at the predetermined times using the computer apparatus. The transactions would ordinarily not be authorized in the absence of the itinerary.

These and other embodiments of the invention are described in further detail below.

BRIEF DESCRIPTION OF THE DRAWINGS

FIG. 3 shows a sample service request in the form of an itinerary.

In the Figures, like numerals designate like elements, and the descriptions thereof may not be repeated.

DETAILED DESCRIPTION

Figure 1:
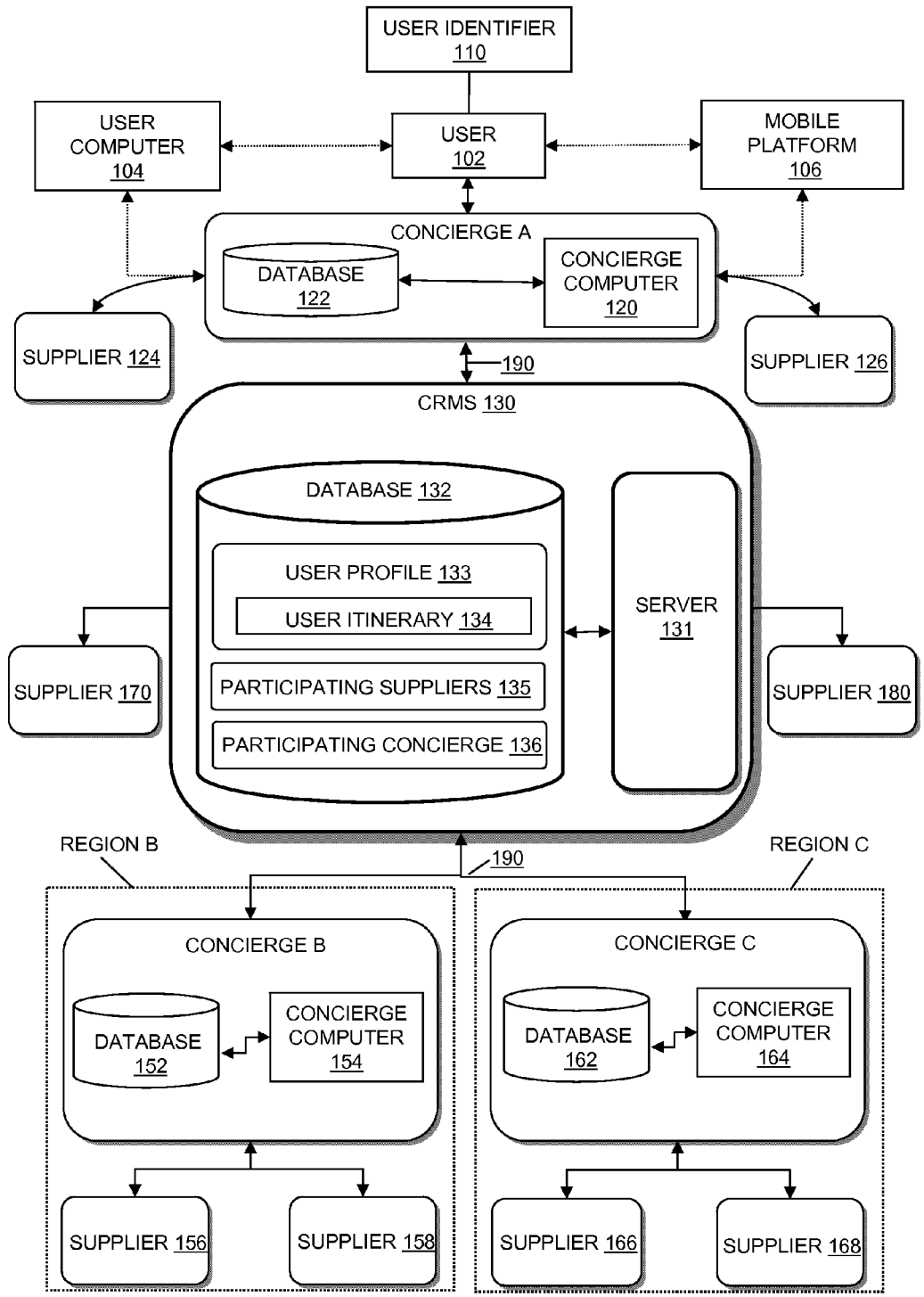
FIG. 1 shows a system according to an embodiment of the invention.

Embodiments are described herein. These embodiments can include global concierge services, providers, systems, and methods of performing global concierge services. Other embodiments of the invention are also directed to computer apparatuses (e.g., computers, servers, etc.) and processes run using computer apparatuses.

In some instances, users may require assistance for various needs. For example, a user may wish to make dining reservations at a popular restaurant. In exemplary embodiments, the use can use the services of a concierge to book the dining reservations. This can save the user valuable time and energy.

The user may have (i.e., be associated with) a user identifier in certain embodiments. This user identifier may comprise a portable consumer device number, or other suitable identification. In one example, the portable user device number may be a credit card number that can identify a credit card account the user maintains with an issuer. An "issuer" is typically a business entity such as a financial institution (e.g., a bank)

which maintains financial accounts for the user and often issues a portable user device such as a credit card or debit card to the user.

In exemplary embodiments, the portable consumer device of the consumer may have certain enhancements. One enhancement may comprise concierge services provided by one or more concierge service providers. The concierge services can include personal assistance, referrals, travel services, etc. In certain embodiments, the user may be given, by the issuer, or other suitable party, a point of contact for the concierge services. For this point of contact, though, there may be various means to contact the concierge services. For example, the point of contact may comprise three contact methods, or channels: a phone number, a web address, and an email address to contact the concierge services. The consumer may use any of the contact methods interchangeably, and each may access the same point of contact for the concierge services. Each of the contact methods may be used to engage with a concierge service provider. In certain embodiments, the point of contact may be localized. For example, the consumer may be given a website address and a phone number. The language used with the website address and the phone messages may depend on the location of the consumer, or on the personal preferences of the consumer. Thus, if the consumer's profile indicates that the consumer's primary spoken language is Spanish, the point of contact can communicate in Spanish.

The concierge services may be provided by a plurality of concierge service providers. In such an embodiment, the point of contact will route the user to the most appropriate concierge service provider. In certain implementations, each concierge service provider in the plurality of concierge service providers may be located in a separate region. The point of contact may then route the user to the geographically closest concierge service provider. For example, the plurality of concierge service providers may comprise three separate concierge service providers. The first concierge service provider may be located in the Americas, the second concierge service provider may be located in Europe and Africa, and the third concierge service provider may be located in Asia and the Pacific islands. A user may call the concierge services phone number while in St. Louis, Mo. In that case, the user will be routed to the concierge service provider for the Americas. Other examples contemplate different regional divisions, such as by country or other groupings. The various concierge service providers in the plurality may have executed contractual agreements with each other, and also with the entity that manages the global concierge system. The contractual agreements may dictate the responsibilities of each entity, and can provide a framework for how each concierge service provider may work together (e.g., ensuring reciprocity). In certain implementations, the concierge service providers may use a hub and spoke model. Each concierge service provider may have a central hub office or call center for the region, with a plurality of satellite offices or call centers to assist with local matters.

In exemplary embodiments, a user can apply for and receive a portable user device from an issuer. This portable user device may include a portable user identifier, and may (complimentary or for an extra fee) provide the user with concierge services. The user may contact the concierge service provider through any suitable channel to request a service. The concierge service provider may first validate the eligibility of the user to use the concierge services. The concierge service provider can receive the portable user identifier, which may be used as a user identifier. The concierge service provider can contact a concierge coordinator, such as a Consumer Relation Management System (CRMS). The CRMS can validate the user to the concierge service provider, such as by authenticating the user identifier, which is the portable user identifier in this example.

The CRMS may send a validation confirmation message to the concierge service provider. This validation confirmation message may also contain further information regarding the user. For example, the message may contain information regarding what services the user is eligible for (out of all possible services), certain user preferences (such as airplane seat preference), etc. The concierge service provider can use the user information to tailor the services provided, which can enhance the user experience.

In some instances, the concierge service provider that is first contacted may not be in the region where the service is to be provided. This can occur when the user is in one region and requests a service in a different region. In such instances, the user can first be directed to the first concierge service provider. The service provider sends the user identifier to the CRMS. The CRMS may validate the user (such as by validating the user identifier), and then can determine the details of the request. The CRMS may determine that the request, or a portion of the request, involves another region. The CRMS can then determine the appropriate concierge service provider. The CRMS may then contact the second concierge service provider regarding the request. The second concierge service provider may perform the tasks relating to the request, and transmit the request status back to the CRMS. The first concierge service provider can remain the primary contact for the user, and can relay any messages from the second concierge service provider. The above implementation has the advantage that the user only needs to deal with a single entity, while still taking advantage of any local knowledge the different concierge service providers may have.

For example, a user may be located in Chicago, but want to book a round trip flight to Tokyo, and also see a sumo wrestling match while there. The user can call the provided concierge phone number to make such a request. After validating the user, the CRMS may determine that a separate concierge service provider, located in Tokyo, is best positioned to purchase the sumo wrestling tickets. The CRMS can then send to the Tokyo concierge the relevant request information. As airplane tickets may not be location dependent, the Chicago based concierge service provider may purchase the tickets, and a portion of the request (i.e., the sumo match tickets) to be delegated to the Tokyo based concierge service provider. The Tokyo based concierge service provider can contact the CRMS once the sumo match tickets are purchased, and can provide appropriate information such as the time of the match and the location of the seats. The Chicago based concierge service provider can then provide the user with the requested flight and sumo match tickets.

I. Service Request Processing

As noted above, some embodiments disclosed herein are directed to systems and methods for global concierge services. In embodiments of the invention, an initial service request comprising a plurality of service items is provided by a user and is received at a computer apparatus. For example, the user may be a business traveler that provides an initial request to a concierge located in San Francisco, Calif., which is the traveler's home city. The initial service request may be provided via phone, e-mail, etc., and may include a request for a hotel in London on Monday and a request for a hotel reservation in Rome on Wednesday, and show tickets in Rome on Wednesday evening. The initial service request may then be sent to a central computer apparatus, which determines which set of a plurality of concierges can service the service items and then outputs service requests to set of concierges. The determination of the set of concierges that will service the requests can be provided in a coordinated manner. The coordination may take into account various factors including the ability of the concierges to services the individual requests efficiently and/or in a cost efficient manner.

Alternatively or additionally, a particular concierge's skill or knowledge may also be a factor in the coordination of the service of the user's service request. For example, a first concierge may be closer to a theatre district in a city than a second concierge. The first concierge is therefore likely to be more knowledgeable about how to get good show tickets in the theatres in the theater district than the second concierge. Consequently, the first concierge may be more likely to be selected to fulfill a service request for show tickets than the second concierge.

A. Systems

FIG. 1 illustrates a system for processing service requests in accordance with an embodiment of the invention. FIG. 1 shows a user 102 in communication with Concierge A at a front end of the system. The user 102 may be an individual, or an organization such as a business that is capable of purchasing goods or services.

The user 102 also has access to a user identifier 110, a mobile platform 106 and a user computer 104. The user computer 104 and the mobile platform 106 are in communication with the Concierge A. The user computer 104 may comprise a computer-readable medium and a display coupled to a processor such as a personal computer or a laptop.

The mobile platform 106 may be in any suitable form. For example, suitable mobile platforms can be hand-held and compact so that they can fit into a user's wallet and/or pocket (e.g., pocket-sized). Examples of portable consumer devices include cellular phones, personal digital assistants (PDAs), etc.

The user identifier 110 may be the user's account number, credit or debit card number, a username and password or any combination of these.

Concierge A can be an initial servicing concierge for the user 102 and may be located in the user's home city or country. Concierge A can operate a concierge computer 120 and a database 122, and has access to various suppliers 124 and 126.

Concierge A is in communication with a Customer Relationship Management System 130 (CRMS) via a network connection 190. The network connection 190 may embodied by any suitable communication path through any suitable network including Internet. The CRMS 130 can be central to the system and may operate a server 131 and a database 132 coupled to the server 131. Server 131 may comprise a powerful computer or a cluster of computers. For example, server 131 may be a large mainframe, a minicomputer cluster, or a group of servers functioning as a unit. The database 132 stores data such as a user profile 133, a list of participating suppliers 135 and a list of participating concierges 136. The database 132 is also capable of storing a user itinerary 134.

The CRMS 130 has access to suppliers 170 and 180, and is also in communication with Concierge B and Concierge C via network connection 190. Although three servicing concierges are illustrated, it is understood that many more concierges can be used in embodiments of the invention. As illustrated in FIG. 1, Concierge B operates a concierge computer 154 and database 152, and has access to suppliers 156 and 158. Concierge C operates a concierge computer 164 and database 162, and has access to suppliers 166 and 168. Each of the concierge computers 120, 154 and 164 may be a personal computer or a laptop computer, and may comprise a computer-readable medium and a display coupled to a processor.

In this example, Concierge B is located in region B and Concierge C is located in region C, as shown. Regions B and C may be geographically separated from each other. For example, Regions B and C may be two separate countries or two separate cities in two separate countries.

Concierges A, B and C can be service providers. In some embodiments, they can be businesses that are capable of providing services. Such concierges may have access to services such as show tickets, restaurants, hotel reservations, etc.

In FIG. 1, each of the databases 122, 132, 152 and 162 may comprise one or more computer-readable storage devices (which may be embodied by memory devices) coupled to one or more processors and capable of storing computer-readable data.

In FIG. 1, suppliers 124, 126, 156, 158, 166, 168, 170 and 180 can be businesses such as merchants that provide goods or services. For example, examples of suppliers may include, without limitation, restaurants, hotels, florists, dry cleaners, movie theaters, ticketing agencies, car rental companies, tour operators, banks, etc.

B. Methods

Figure 2:
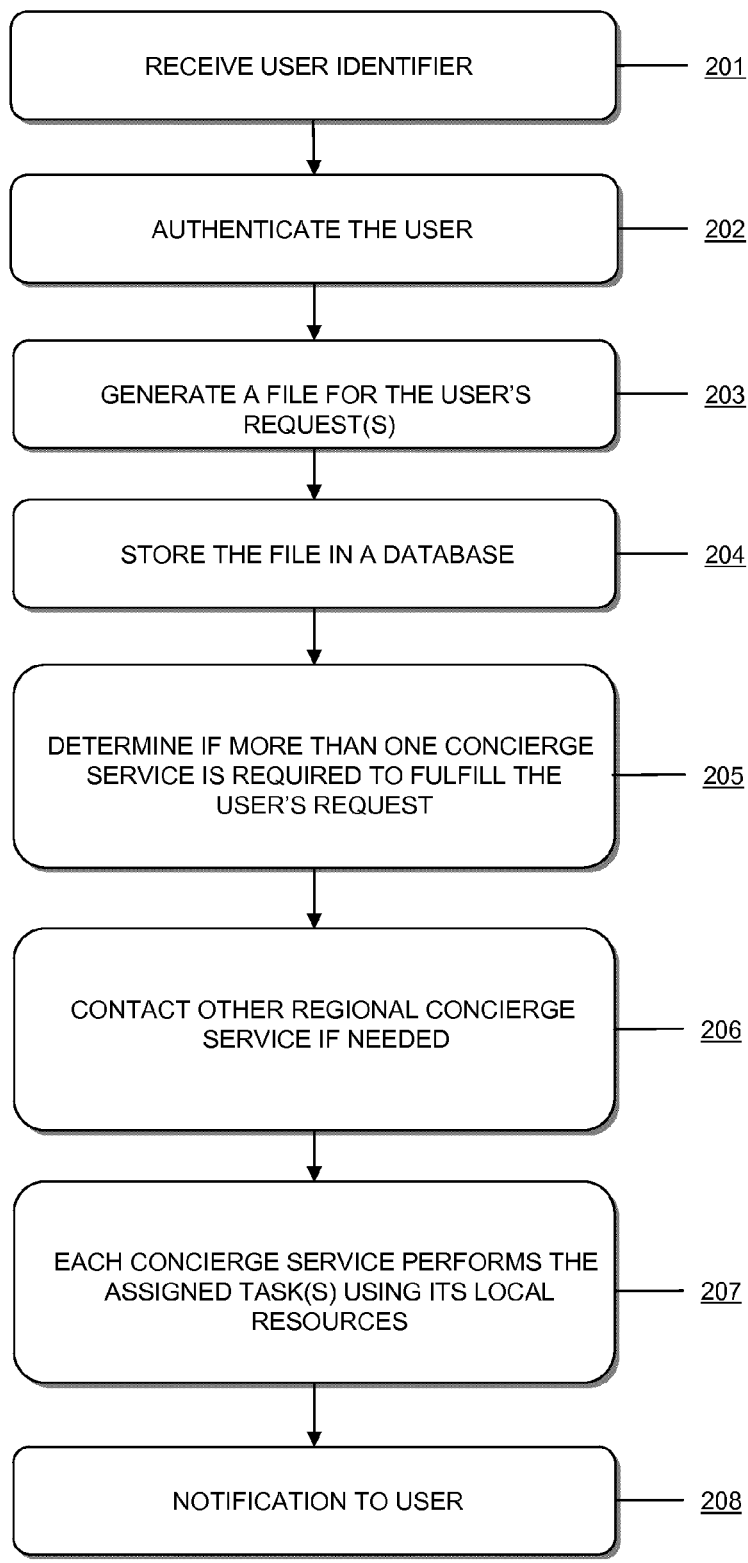
FIG. 2 shows a flowchart illustrating the steps of managing and processing user requests according to an embodiment of the invention.

Methods of processing service requests according to embodiments of the invention will now be described with reference to FIG. 1 and FIG. 2. FIG. 2 is a flowchart that illustrates the steps for managing and processing service requests.

Referring to FIG. 1, in one embodiment, the user 102 contacts Concierge A with one or more requests. The user 102 may communicate with Concierge A using the user computer 104 and/or the mobile platform 106. For example, the user 102 may contact Concierge A using an e-mail or form on a Web browser on the user computer 104. In another example, the user 102 may call Concierge A using the mobile platform 106 and may provide two or more service requests for Concierge A to fulfill. The two or more service requests can include service requests that are more appropriately fulfilled in regions outside of Concierge A's home location or home city.

At some point in the process, Concierge A receives a user identifier 110 from the user 102. After Concierge A receives this information, Concierge A communicates with the CRMS 130 through the network connection 190 and provides the user identifier 110 received from user 102 to the server 131. At some point, the server 131 receives the user identifier 110 (this is shown as block 201 in the flowchart of FIG. 2), and the server 131 authenticates the user 102 using the received user identifier 110 (this is shown as block 202 in FIG. 2). During or after the authentication process, server 131 locates the user profile 133, associated with the user 102, that is stored in database 132. The user profile 133 or an appropriate portion of it, as determined by security settings or level of access, is provided to the Concierge A. Using the data in the user profile 133, Concierge A can determine the level of service that can be provided for user 102. Depending on the type of account of the user 102, some services may not be available or may be available for additional fees.

In some instances, in the embodiments that the user identifier 110 is the credit or debit card number of a user, the CRMS 130 may only validate a portion of the user identifier 110, such as the first 6 digits. In these instances, the database 132 will maintain information based on groups of users that have the same first 6 digits. In other instances, the CRMS 130 will validate the entire user identifier 110 (e.g. all 16 digits). In these instances, the database 132 can maintain separate information for each user, to provide more personalized data.

After, before, or during the authentication process, the user 102 submits a service request to Concierge A. Based on the service request, Concierge A uses the computer concierge 120 to generate an itinerary file for the user's service request that is comprised of one or more service items. This is shown as step 203 in FIG. 2. Concierge A sends the file through the network connection 190 to the CRMS 130. The server 131 stores this itinerary file in the form of a user itinerary 134 in the database 132. This is shown as step 204 in FIG. 2, itinerary 134 may be associated with the user profile 133 for record keeping and data processing purposes which will be later described in detail.

The server 131 processes the user itinerary 134 and determines if any of the service items associated with the itinerary 134 should be delegated to other concierges such as Concierges B and C. This is shown as step 205 in FIG. 2.

The determination of service item delegation is performed automatically based on pre-set criteria. The pre-set criteria can be used to delegate a particular service item of the itinerary 134 to a concierge (e.g., Concierge B or C) other than the originating concierge (e.g., Concierge A). This can be based on, for example, regional boundaries, type of the service request or any suitable combination of any such criteria. In a case where a regional boundary is the determining criterion to delegate one or more service items of the itinerary 134 to another concierge service, the server 131 can detect those items in the itinerary where the requested service is in a different location other than the location of the originating concierge. For example, one way to implement the regional boundary as the determining criterion is to associate a regional code with each of the service items based on the desired location of the service. This may be done during the generation of the itinerary file where a code is associated with each service item based on the location of that service.

The server 131 then matches those service items for different regions with participating concierge services. This may be performed by accessing participating concierges 136 in the database 132. The database 132 stores a list of concierge services that participate in the global concierge program. After an appropriate concierge is found based on the criteria, the server 131 contacts the selected concierge and outputs one or more of the service items of itinerary 134 in the form of a request message to the concierge computer of that concierge (for example, concierge computer 154 in Concierge B) through network connection 190. This is shown as block 206 in FIG. 2.

At this point, the service items of itinerary 134 may be coordinated among one or more concierge services in different locations. Each concierge service then fulfills the assigned service item by contacting its local resources or suppliers. This is shown as block 207 in FIG. 2. After fulfillment of each service item, each concierge sends a confirmation to the CRMS 130 that its assigned services items have been fulfilled, and the user 102 is notified thereafter. This is shown as block 208 in FIG. 2.

In one embodiment, it may not be necessary to delegate a particular task to another concierge service, when the CRMS 130 can directly delegate the service item to a supplier. This may happen in a situation where Concierge A cannot provide a particular service in a remote region. However, during the determination process (step 205 of FIG. 2), the server 131 determines that there is a supplier in direct contact with the CRMS 130. This may be performed by accessing the list of participating suppliers 135. If the supplier is identified as suitable to perform that service request, the service item is then sent to that supplier from the server computer 131.

Concierge services may also contact suppliers that they work with in order to fulfill a portion or the entirety of a service item assigned to them. Concierge A, for example, is in contact with the suppliers 124 and 126. If the need arises, concierge computer 120 provides one or more service items to one of more suppliers 124, 126 that can fulfill that service request. Concierges may also have local databases (e.g., databases 122, 152, 162) where they keep data related to their local resources, and use it to locate a particular resource.

In one embodiment, the originating concierge (e.g., Concierge A) populates the user profile 133 with user preferences that can be used in the future to better serve the user 102. For example, the originating concierge sets the user profile 133 to mention that the user 102 prefers an aisle seat in an airplane, and prefers a hotel that has a gym. This data is used in the future to automatically generate a list of resources and services based on the particular preferences of the user 102. More specifically, when service items are sent to different concierges to fulfill, each concierge can refer to the preferences set in the user profile 133 when attempting to fulfill the service items. The user profile 133 may also be used to determine a language that the user 102 uses, so that messages or documents sent to the user 102 may be translated into that language, or when the user 102 contacts a concierge, he is routed to an agent with proficiency in that language or specific dialect.

In certain embodiments, the user 102 may be enrolled in one or more rewards programs. For example, an issuer may provide one rewards program linked to the credit card, and the user may also enroll the credit card in an airline rewards program. In some implementations, different concierge service providers may also have their own rewards programs. The CRMS 130 may centrally store the details of each rewards program, such as in the database 132. Each Concierge A, B and C, can then have access to the various rewards programs that the user 102 is enrolled in. Furthermore, contractual agreements can govern the use of points across various rewards programs. Thus, points accrued in a first rewards program may be redeemed in a second rewards program that is different from the first rewards program. For example, the user 102 may request a service from Concierge A, to assist in buying a product from a rewards program offered by an issuer. The user 102 may wish to use points accrued in an airline rewards program. Concierge A, using the data stored in database 132 of the CRMS 130, can redeem the airline rewards program points in the issuer rewards program, to purchase the product.

In one embodiment the above processes may be performed by one or more software applications running on different parts of the system. For example, one or more software applications may work in concert on the server 131 to receive the user identifier 110 from Concierge A, authenticate the user 102, receive the data associated with itinerary 134, process the data as necessary, store the data in the appropriate location in database 132, automatically coordinate the service items of the itinerary 134 among one or more concierge services and output a service request to one or more concierges at the conclusion of the determination process. In addition, one or more software applications may work in concert on concierge computers 120, 154, 164 to generate an electronic file containing the service items, transfer the user identifier to the server 131, transfer the service request to the server 131, receive a service request from the server 131, access the user profile 133 to determine the user's pre-set preferences, search the concierge database (e.g. databases 122, 152 and 162) for resources based on the service items and output a service request to one or more suppliers (e.g. suppliers 124 and 126).

This system and the method of processing service requests will now be described with reference to a specific example that utilizes the aforementioned system, and simulates the aforementioned process. It will be understood by those skilled in the art that the following example is one of many possible embodiments of this novel invention and it is not intended to be limiting.

FIG. 3 is a sample of a service request from a user in the form of an itinerary 300. As shown in FIG. 3, this itinerary has 15 service items. A user, in this example, can travel to three cities in three different countries at predetermined times and has a couple of requests for each of the destinations. Specifically, the user, in this example, will travel from San Francisco to New York, N.Y. to London, London to Paris and Paris to San Francisco. In addition to these four one-way airline tickets (shown as service items 1-4 in FIG. 3), the user requires a hotel reservation at each destination (service items 5-7 in FIG. 3), and roundtrip transportation service to and from the airports (service items 8-11 in FIG. 3). Moreover, the user needs other services at other locations. For example, the user needs a car rental and a show ticket reservation in Paris (service items 12 and 15 respectively in FIG. 3), a restaurant reservation in New York (service item 13 in FIG. 3) and a gift delivery in San Francisco (service item 14 in FIG. 3).

Figure 4:
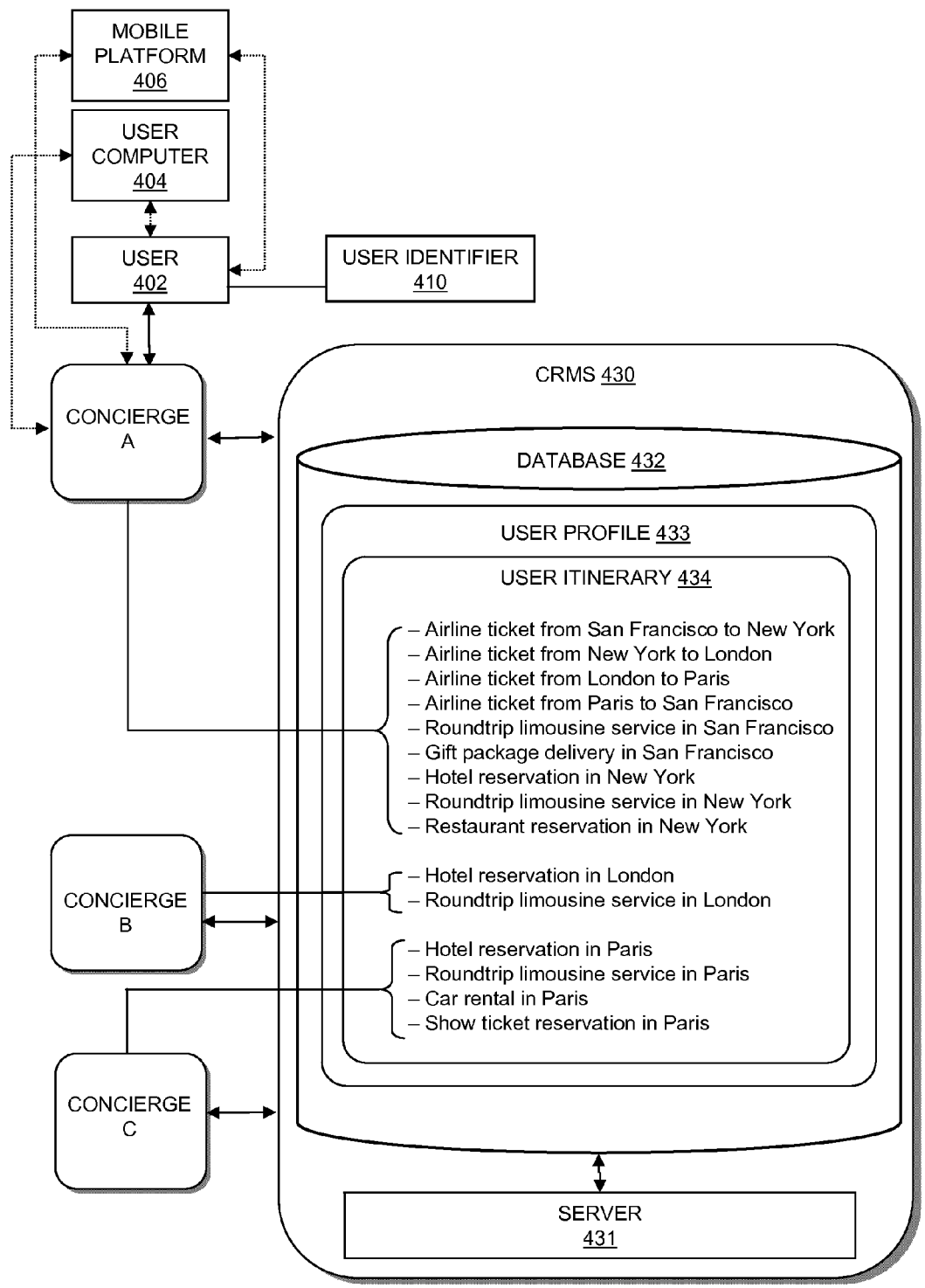
FIG. 4 shows the system of FIG. 1 processing the itinerary of FIG. 3.

FIG. 4 is similar to the system of FIG. 1 (with some components omitted) and illustrates the processing of service requests of itinerary 300 of FIG. 3. In FIGS. 1 and 4, the following elements correspond and descriptions thereof may not be repeated: User 102, 402; mobile platform 106, 406; user computer 104, 404; user identifier 110, 410; database 132, 432; user profile 133, 433; user itinerary 134, 434; server 131, 431; and CRMS 130, 430. The user 402 contacts Concierge A and submits a service request with the service items of itinerary 300 in FIG. 3. Concierge A receives a user identifier 410 from the user 402 and sends the user identifier to server 431 in CRMS 430. After receiving the user identifier 410, the server 431 authenticates the user by accessing the user profile 433, and communicates the result to Concierge A. Concierge A generates an itinerary file using a concierge computer (not shown) and sends the itinerary file to server 431. Server 431 stores the itinerary in the database 432 as the user itinerary 434 and associates it with the user profile 433.

The server 431 determines that more than one concierge is required to fulfill all of the service items in itinerary 434. In this example, the criteria are the locations of the requested services that fall in other predetermined regions or countries. The server 431 coordinates the service requests among three regional concierges and sends a request message to each of the concierges. For this example, it is assumed that Concierge A is in San Francisco, Concierge B is in London and Concierge C is in Paris. The server 431 determines that all the service items in the United States should be assigned to Concierge A that has expertise and local resources in the United States. Therefore, Concierge A is assigned with nine of the fifteen service items. Server 431 also determines that two of the fifteen service items should be assigned to Concierge B in London, and four of the fifteen service items should be assigned to Concierge C in Paris. FIG. 4 illustrates the coordinated service items among the concierge services.

After service items are coordinated, the various concierges may access the user profile to determine if the user has any particular pre-set preferences with regard to any of the service items. For example, Concierge A may determine that the user 402 would like to stay in a hotel that has a gym. In an effort to satisfy the user's preference, Concierge A searches its database (not shown) for a list of hotels in New York that have gym facilities.

Finally, the user 402 is provided with a confirmation that the service requests have been processed. Thereafter, the user 402 has access to the itinerary 300 through user computer 404, or mobile platform 406 and/or directly by contacting the Concierge A.

At any time during the travel, the user 402 can access one of the concierge services and modify and/or update the itinerary. The user 402 can be provided with a phone number for outside the United States, in this example, to be able to contact the concierge services should the need arise. The user 402 may also use an alternate form of communication such as user computer 404 or mobile platform 406. For example, the itinerary 434 can be accessed by user 402 via a web site or through an application on a cellular phone.

Originally, the itinerary 300 of FIG. 3 may not contain all the service items as the user 402 may not anticipate some of the requests during the initiation of the first service request. Nevertheless, the user 402 can contact any of the concierge services and submit additional requests and/or modify the existing ones. All of the concierges involved with fulfilling the service requests have access to the itinerary and can modify it as instructed by the user 402. In one embodiment, the system may be set up in a way that user 402 contacts the originating concierge for additional requests. If any of the additional requested service items cannot be fulfilled by the originating concierge, they are sent to and are coordinated with other concierge services. Regardless of whether the originating concierge or any of the other involved concierges handle the additional requests, from the point of view of the user, he or she contacts the same concierge since all of the involved concierge services have access to the user's itinerary.

Going back to the previous example, assuming that the user 402 is currently in London, and would like to arrange a gift delivery in San Francisco, the user 402 may use an international number that is provided to him, and using the user computer 404 or mobile platform 406, the user 402 may contact a concierge service and may submit a request for the gift delivery. In this example, the user 402 submits the request by calling an international phone number where the user is routed to the originating Concierge A, who submits the request. The request is added to the user's itinerary as a service item and server 431 assigns the service item back to Concierge A. The server 431 may then generate an updated user itinerary 434.

It can be appreciated that this system will provide capabilities that advantageously help a user plan a multi-destination trip, without the need to contact numerous resources and try to manually coordinate all the service requests of an itinerary similar to itinerary 300 of FIG. 3. In addition, the user can modify the travel plan during the travel. This system is particularly advantageous in that it allows the user to conveniently alter the travel plan where a concierge service does not have to manually re-coordinate all the items of an itinerary. For example, if the user 402, in the previous example, decides to extend his/her stay at one of the destinations, and if this modification results in conflicts with other items of the itinerary such as a flight date to another location, a concierge can help the user by re-arranging the service items and/or changing the predetermined dates. Without utilizing such a system, one must go through a difficult manual process to contact each airline carrier and change flight dates and re-coordinate many or all of the itinerary items.

In addition to processing service requests, this system may be used for marketing purposes and gathering useful data that can be processed, packaged and used in a variety of ways.

Figure 5:
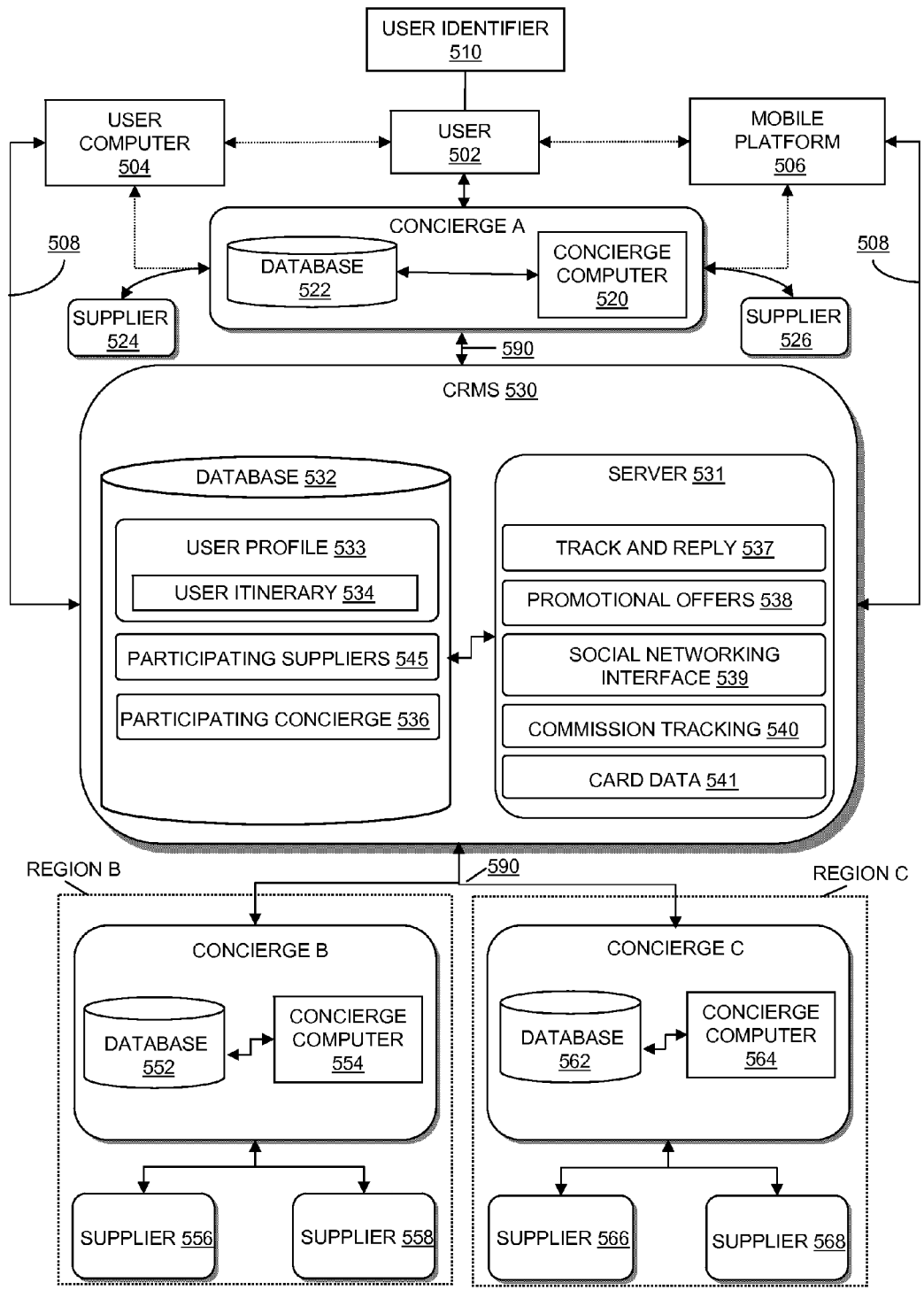
FIG. 5 shows a system according to an embodiment of the invention.

FIG. 5 shows a system similar to the system of FIG. 1, having additional modules in communication with database 532.

In FIGS. 1 and 5, the following elements correspond and descriptions thereof may not be repeated: User 102, 502; mobile platform 106, 506; user computer 104, 504; user identifier 110, 510; concierge computers 120, 520, 154, 554, 164, 564; databases 122, 522, 152, 552, 162, 562; suppliers 126, 526, 124, 524, 156, 556, 158, 558, 166, 566, 168, 568; database 132, 532; user profile 133, 533; user itinerary 134, 534; participating suppliers 135, 545; participating concierge 136, 536, server 131, 531; and CRMS 130, 530.

The modules in communication with the database 532 may be in the form of software applications on the server 531, or may be running on one or more remote computer systems that have access to the CRMS 530 and the database 532. These modules include the following: track and reply 537, promotional offers 538, social networking interface 539, commission tracking 540 and card data 541. FIG. 5 also shows a network connection 508 from the user computer 504 and the mobile platform 506 to the CRMS 530. One or more software applications may run on user computer 504 and mobile platform 506 and work in concert to allow the user 502 access user itinerary 534 and any of the above elements. Each of these elements and their relationship with this system will now be described in detail.

The track and reply module 537 can track the service items of the user itinerary 544 and provide a status of the service items to the user 502 either through a concierge or through the network connection 508. Using network connection 508, the user 502 can get up-to-date tracking information via user computer 504 and/or mobile platform 506. The rack and reply module 537 can be used where the user 502 would like to be informed on the status of a service request such as an updated flight time or to track the delivery of an item. For example, user 502 can access CRM 530 through a web address and review the user itinerary 544 and track the service items as needed. This service is useful because it allows the user to stay up-to-date and informed about the status of the service request. It is also useful for managing and processing the service items, since CRM 530 or any of the concierges can utilize this service to better manage the user's requests with accuracy and efficiency.

Promotional offers module 538 can provide promotional offers to the user 502 through a concierge. The type of the promotional offers may be directly related to a particular service request. For example, if one of the service requests of the user 502 is a car rental, at the time that Concierge A is in communication with the CRMS 530 with the message to send the service request and have server 531 coordinate the service items, promotional offers module 538 informs Concierge A that there is a special offer from a car rental company that may benefit the user 502. The user 502 will benefit from the offer by spending less for the service.

Promotional offers module 538 may also engage in targeted advertising based on the data available in database 532 regarding the user's spending habits or type of services requested. The database 532 may contain data relating to transactions that the user 502 has conducted using various payment cards (e.g., credit cards) issued by various issuers. Using this information, promotional offer module 538 may contact the user 502 and present offers to the user 502. In comparison with mass advertising, this form of targeted advertising may have a better chance of response from a user. For example, if the user 502 uses the user computer 504 to access the user itinerary 544, promotional offers module 538 may inform the user 502 about offers that are available for a particular destination that the user will be traveling to. This may be done by presenting an advertisement in the software application that allows user computer 504 to access the itinerary 534. For example, the advertisement may be presented in a web page that is used by the user 502 to access the user itinerary 534. In this way, the user may enjoy additional services for less cost and promotional offers 538 will generate additional revenue.

Figure 8:
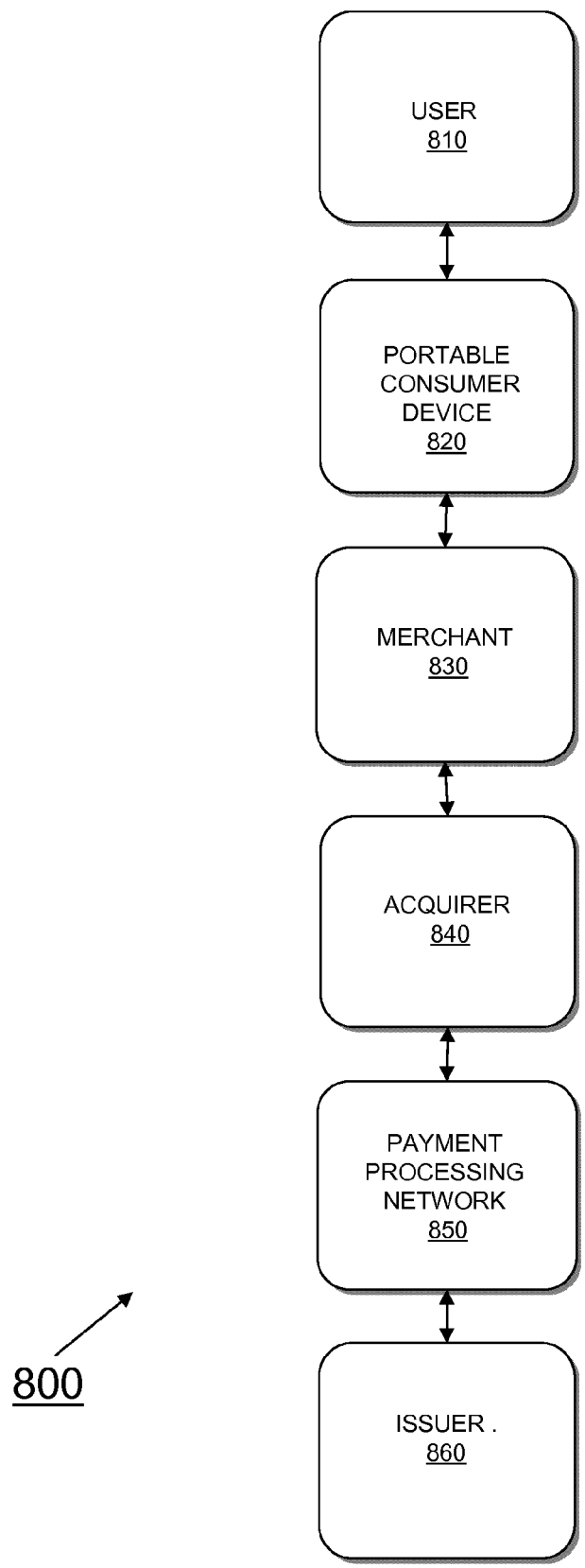
FIG. 8 shows a system according to an embodiment of the invention.

In one embodiment, promotional offers may be based on the data received from a payment processing network such as the payment processing network 850 in FIG. 8. Based on transaction data of the user 502 supplied by a payment processing network, spending habit of the user 502 and the type of activity that the user 502 performs may be determined and used by the promotional offers module 538 for a type of offer that has a high chance of response from the user 502. For example, based on the transaction history of the user 502, it can be determined that user 502 enjoys golf. Accordingly, the promotional offers module 538 may present an offer to the user 502 that is related to golf. The transaction data supplied by a payment processing network may be stored in the user profile 533.

Social networking interface module 539 can allow the user 502 to share his/her experiences about the services provided in forms of reviews, or communication with other friends having access to the social networking interface 539. This application may also be configured to communicate with other existing social networking services to provide a broader reach for both the system and the users. The user 508 may be able to connect to the social networking interface 539 through network connection 508 by using the user computer 504 and/or mobile platform 506, and engage in networking with others connected through the same interface.

Commission tracking module 540 may be used by the system for internal purposes to keep track of commissions received based on services that were referred to various suppliers. This application may help in record keeping and performance evaluation of various resources and assets. The gathered data may provide statistics that provide the ability to study the current implementation and diversification of the resources, and help in strategic decision making.

Card data module 541 may be used to keep a record of the user's transactions and may be used to determine the eligibility and level of service that is available to a user based on the account information. Card data module 541 can be used when the system is being used by a credit or debit card issuer or the like, having access to user's account information and having the ability to integrate account information with this system to perform account level processing. For example, card data module 541 may be used to track the activity of user 502 and offer other account types or status to the user 502. Nevertheless, in a case where this system is being implemented by an entity other than a credit or debit card issuer, card data module 541 can be implemented. In this situation, the card data module 541 may be available for participating issuers that provide the account level processing as an application that communicates with the CRMS 530 or provide data in a predetermined format when the interface is provided by the CRMS 530.

Collectively, the above-described elements and their features provide advantages for both a user and the system. Such elements can help the user enjoy additional benefits, financially or otherwise, and will provide a better experience for the user. The system also benefits from the interaction of users with these elements by gathering useful data that can be processed and packaged in variety of ways. This data may be used in statistical analyses that are employed to study and improve the system, or could be provided to business entities as products. For example, processed and packaged user data can be made available to data mining services if desired. In addition, from the point of view of a user, using this system can provide a single point of contact for the user's needs, thus making the system very efficient.

II. Authorization Controls Using Itinerary

A. Systems

An automated system, such as the system of FIG. 1, may also help users with aspects of their travel. For example, users may have difficulty getting payment transactions authorized during travel. This is because fraud engines may determine that transactions conducted outside of the consumer's home location may be potentially fraudulent, and may a corresponding authorization processor may deny authorization if it is not notified by the user in advance.

Many of the issuers of credit cards automatically block the transactions originate from a location that may be relatively far from the location of the residence of the user. This is a security measure by the issuers to reduce the risk of fraudulent activities that may result from identity theft or cloning of an account number of a user. In order to avoid this problem, users have to contact their issuers and inform them about future travel ahead of time. Some issuers even require additional information such as the location, date of departure, duration of stay and approximate amount that users may spend. This information is used to temporarily set the issuer's system to accept transactions from distant locations relative to the primary location of the user. Although this measure may benefit the issuer to safeguard against fraudulent activities, it may result in inconvenience for a user who has to call an issuer to report a pending travel. Embodiments of the invention can address this problem by automatically informing the issuers or a central payment processing network about the user's plans (itinerary and service items) so that issuers or other entities can authorize future transactions requiring users to specifically contact their issuers. Moreover, since a central server is provided with the user's itinerary and service items, this information can be accessed by or sent to multiple issuers. Thus, if the user uses many payment cards, the user does not need to contact each one of them. The user can simply provide an itinerary once, and the central server can automatically inform them of the user's travel and plans.

Figure 6:
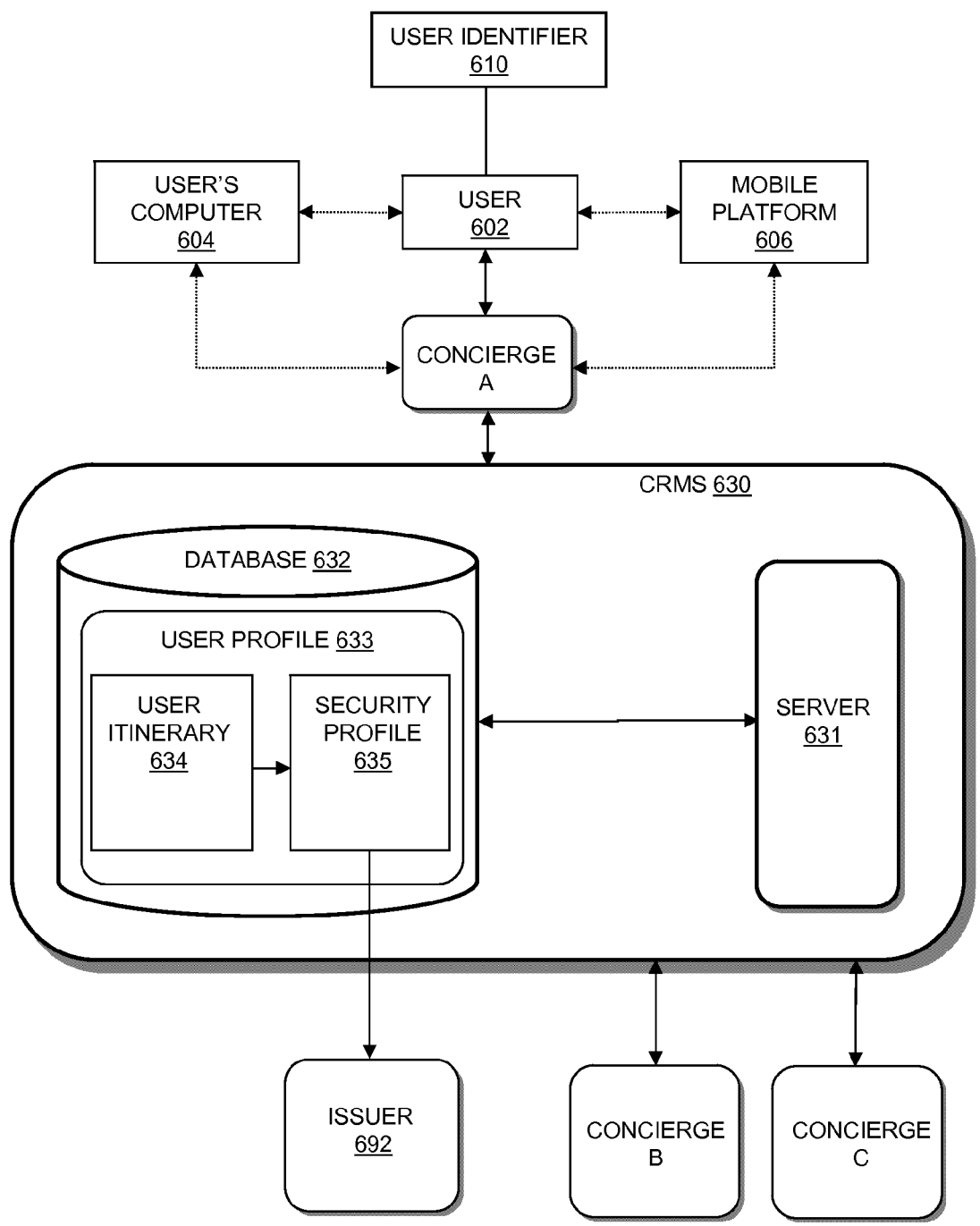
FIG. 6 shows a system according to an embodiment of the invention.

FIG. 6 illustrates a system similar to FIG. 1. FIG. 6 shows a security profile 635 associated with the user profile 633 and the user itinerary 634. FIG. 6 also shows issuer 692 coupled with the CRMS 630. The CRMS 630 may be present in or in communication with a payment processing network (not shown). In FIGS. 1 and 6, the following elements correspond and descriptions thereof may not be repeated: User 102, 602; mobile platform 106, 606; user computer 104, 604; user identifier 110, 610; database 132, 632; user profile 133, 633; user itinerary 134, 634; server 131, 631; and CRMS 130, 630. After Concierge A generates an itinerary for the user 602, the CRMS 630 can use the data of itinerary 634 to populate a security profile 635. The security profile 635 contains information about the dates, locations of travel, duration of stay, etc. that are provided from the information of itinerary 634. Further, the particular service items may also indicate what kinds of expenses that the user 602 may make using his payment cards. For example, if the user 602 requests a service item including a dinner reservation at a five star restaurant in Tokyo, the user may be pre-authorized to conduct a payment transaction for the cost of a meal for a reasonable number of persons at that restaurant. This information may then be sent to issuer 692 and other issuers, or an associated payment processing organization such as Visa or Mastercard, so that transactions that are conducted that are consistent with the user's itinerary and service items are pre-authorized and are not declined.

In one embodiment, a computer-readable program code in the form of a software application may be running on the server 631. This application extracts the data from user itinerary 634, populates the security profile 635 and sends the data in the security profile 635 to issuer 692. Issuer 692 may also use a software application that is configured to process these data and update another program or system that is used to authorize the transactions. In another embodiment, a software application running on server 631 may be configured to directly update the program or system that is used to authorize the transactions.

In one embodiment, security profile 635 may be generated in different formats depending on the issuer. For example, issuers may have different data format requirements so that they can digest the data from the security profile 635 and automatically update their system. In another embodiment, security profile 635 may be generated using a standard format where all the participating issuers are capable of processing the data contained in security profile 635.

B. Methods

Figure 7:
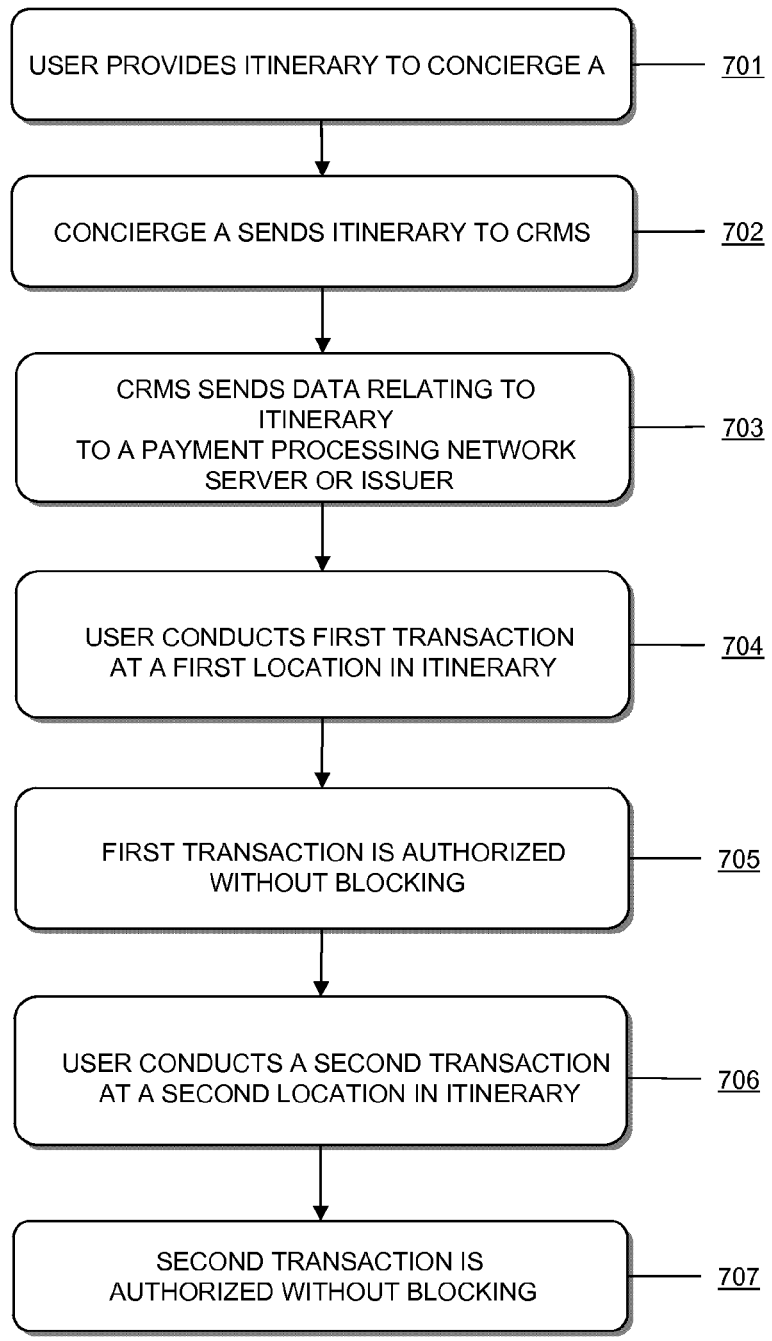
FIG. 7 shows a flowchart illustrating the steps of authorizing one or more charges based on an itinerary according to an embodiment of the invention.

FIG. 7 illustrates a flowchart that shows steps of generating a security profile and updating the issuer with the information in the security profile in accordance with an embodiment of the invention. This flowchart will be explained with reference to the system of FIG. 6. In step 701, user 602 submits a service request regarding a multi-destination trip to Concierge A. The multi-destination trip can include a trip to a first destination and a second destination.

Concierge A then generates an itinerary from the service request. In step 702, Concierge A sends the itinerary 634 to the CRMS 630. The CRMS 630 then populates the security profile 635 with the data from the itinerary 634 and sends the data to the issuer 692 or a payment processing network associated with the issuer 692. This is shown as block 703. The user 602 then travels to the first destination on the itinerary and conducts a transaction using a payment card from the issuer 692. This is shown in block 704. Since the user has prior information about the user's location on the transaction date in the security profile 635, the issuer 692 authorizes the transaction if the transaction is conducted at the first destination. This is shown in block 705. In block 706, the user 602 travels to the second destination and conducts a transaction. Again, using the data provided from the security profile 635, the issuer 692 authorizes the transaction. This is shown as block 707.

If the issuer 692 or payment processing network sees a transaction in the user's home location while the user is supposed to be in either the first or the second destination, then the issuer 692 could deny the transaction.

FIG. 8 shows a system 800 that can be used in an embodiment of the invention. The system 800 includes a merchant 830 and an acquirer 840 associated with the merchant 830. In a typical payment transaction, a user 810 may purchase goods or services at the merchant 830 using a portable consumer device 820. The acquirer 840 can communicate with an issuer 860 via a payment processing network 850.

The portable consumer device 820 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The payment processing network 850 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 850 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 850 may use any suitable wired or wireless network, including the Internet.

In a typical purchase transaction, the user 810 purchases goods or a service at the merchant 830 using a portable consumer device 820 such as a credit card. An authorization request message is then forwarded to the acquirer 840. After receiving the authorization request message, the authorization request message is then sent to the payment processing network 850. The payment processing network 850 then forwards the authorization request message to the issuer 860 of the portable consumer device 820.

After the issuer 860 receives the authorization request message, the issuer 860 sends an authorization response message back to the payment processing network 850 to indicate whether or not the current transaction is authorized (or not authorized).

As noted above, the issuer 860 may obtain the user's itinerary and service items from the CRMS and this information can be used to determine whether or not the transaction is initially authorized. For example, the user's itinerary indicates that the user is going to be in Tokyo on January 2 and has a dinner reservation at a particular restaurant at 7 pm in Tokyo. If the authorization request message at 7 pm indicates that the transaction is coming from California, or is coming from an electronics store in Tokyo at 8 pm, then the payment request may be denied since this is inconsistent with the itinerary and service items. If the authorization request message indicates that a transaction took place at 10 pm at that particular restaurant, then the payment request can be automatically approved. The latter transaction can be approved, even though the user did not directly contact his issuer to inform him of his travel plans.

After the payment processing network 850 receives the authorization response message, it then forwards the authorization response message back to the acquirer 840. The acquirer 840 then sends the response message back to the merchant 830.

At the end of the day, a clearing and settlement process between the payment processing network, the acquirer, and the issuer can occur.

The various participants and elements in the previously described system diagrams (e.g., the computers, issuers, servers, etc. in FIGS. 1, 5, 6, 8, etc.) may use any suitable number of subsystems to facilitate the functions described herein.

Figure 9:
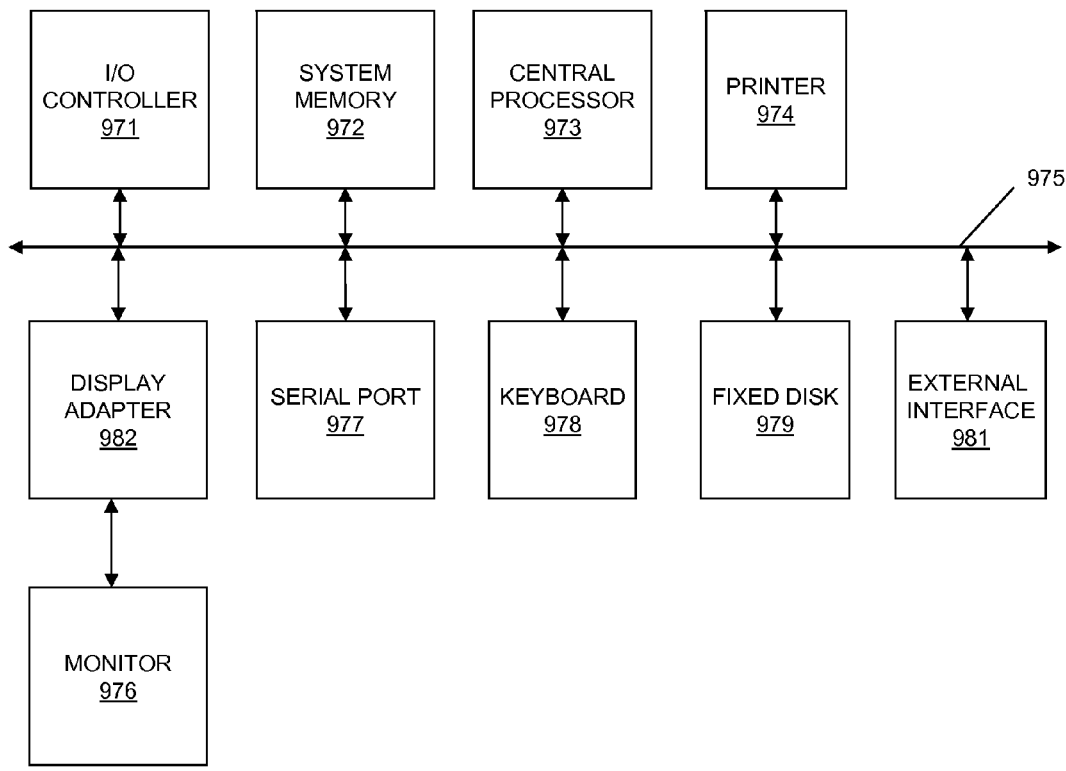
FIG. 9 shows a system according to an embodiment of the invention.

Examples of such subsystems or components are shown in FIG. 9. The subsystems shown in FIG. 9 are interconnected via a system bus 975. Additional subsystems such as a printer 974, keyboard 978, fixed disk 979 (or other memory comprising computer-readable media), monitor 976, which is coupled to display adapter 982, and others are shown. Peripherals and input/output (I/O) devices, which couple to I/O controller 971, can be connected to the computer system by any number of means known in the art, such as serial port 977. For example, serial port 977 or external interface 981 can be used to connect the computer apparatus to a wide area network such as the Internet, a mouse input device, or a scanner. The interconnection via system bus allows the central processor 973 to communicate with each subsystem and to control the execution of instructions from system memory 972 or the fixed disk 979, as well as the exchange of information between subsystems. The system memory 972 and/or the fixed disk 979 may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A computer-implemented method comprising:
receiving, from a first computer apparatus, an initial service request comprising a plurality of service items at a second computer apparatus, wherein the initial service request is generated at the first computer apparatus based on data associated with an itinerary indicating a user's plans to travel to one or more locations outside the user's home country at predetermined times, and wherein transactions relating to the itinerary are authorized at locations that would not ordinarily be authorized in the absence of the itinerary, and wherein transactions are blocked in the user's home count during times when the user is traveling abroad;

determining, using the second computer apparatus, which of a set of a plurality of concierges can service the service items;

outputting electronically, using the second computer apparatus, a plurality of service requests to the set of concierges, wherein the plurality of services requests are provided in a coordinated manner, and wherein the second computer apparatus is configured to electronically receive one or more additional or modified service requests and re-coordinate the plurality of service requests based thereon, and running a plurality of software modules on the second computer apparatus having access to the service items, wherein the plurality of software modules track the progress of fulfilling each service item, provide information regarding the status of service items to a user and provide promotional offers to the user based on the service items;

wherein the concierges in the set of the concierges in the plurality of concierges are in different countries;

wherein the second computer apparatus is configured to receive additional service requests that were not originally submitted from the first computer apparatus, and to electronically re-coordinate the plurality of service requests among one or more concierges in the different countries;

wherein determining which set of a plurality of concierges to service the service items is performed automatically based on pre-set criteria; and wherein documents and messages related to the service request are translated to a specified language based on a user profile.

2. The method of claim 1 wherein outputting the plurality of service requests to the plurality of concierges includes sending a request message to at least one of the set of the plurality concierges using the second computer apparatus.

3. The method of claim 1 wherein the initial service request is received from a first concierge in a user's country.

4. The method of claim 1 wherein the initial service request is received from a user who originates the initial service request.

5. The method of claim 1 wherein outputting the plurality of service requests to the plurality of concierges includes sending a request message to at least one of the set of concierges using the second computer apparatus.

6. The method of claim 1, wherein the coordination of the initial service request and re-coordination of an additional service request are based on level of access of a concierge to local resources.

7. The method of claim 1, wherein the initial service request is received at the computer apparatus from a mobile device of a user.

8. The method of claim 1, further comprising:
accessing a user profile after receiving the initial service request, wherein the user profile indicates types and levels of services that can be provided for a user.

9. The method of claim 8, wherein a portion of the user profile is accessible by the first computer apparatus, and wherein an access level to the user profile is determined by a pre-defined security setting.

10. The method of claim 1, wherein determining which set of a plurality of concierges can service the service items is based on a regional code associated with each service item.

11. A system comprising:
a processor;
a non-transitory computer readable medium coupled to the processor, wherein the non-transitory computer readable contains program code run by the processor and configured to:
receive an initial service request comprising a plurality of service items at a first computer apparatus, wherein the initial service request is generated based on data associated with an itinerary indicating a user's plans to travel to one or more locations outside the user's home country at predetermined times, and wherein transactions relating to the itinerary are authorized at locations that would not ordinarily be authorized in the absence of the itinerary, and wherein transactions are blocked in the user's home country during times when the user is traveling abroad;
determine which of a set of a plurality of concierges can service the service items;
output a plurality of service requests to the set of plurality of concierges, wherein the plurality of services requests are provided in a coordinated manner, and
run a plurality of software modules having access to the service items, wherein the plurality of software modules track the progress of fulfilling each service item, provide information regarding the status of service items to a user and provide promotional offers to the user based on the service items;
wherein the concierges in the set of the concierges in the plurality of concierges are located in different countries;
receive additional service requests at a second computer apparatus and re-coordinate the plurality of service requests among one or more concierges in the different countries when one or more additional service requests are received; and
wherein determining which set of a plurality of concierges can service the service items is performed automatically based on pre-set criteria.

* * * * *